(12) United States Patent
Uemoto et al.

(10) Patent No.: US 11,194,336 B2
(45) Date of Patent: Dec. 7, 2021

(54) WORK VEHICLE

(71) Applicant: Kubota Corporation, Osaka (JP)

(72) Inventors: Kensuke Uemoto, Sakai (JP); Takeshi Komorida, Sakai (JP); Nobuyuki Yoshii, Sakai (JP); Katsuhiko Uemura, Sakai (JP); Shinichi Yamada, Sakai (JP)

(73) Assignee: Kubota Corporation, Osaka (JP)

( * ) Notice: Subject to any disclaimer, the term of this patent is extended or adjusted under 35 U.S.C. 154(b) by 238 days.

(21) Appl. No.: 16/154,761

(22) Filed: Oct. 9, 2018

(65) Prior Publication Data

US 2019/0179326 A1 Jun. 13, 2019

(30) Foreign Application Priority Data

Dec. 12, 2017 (JP) .............................. JP2017-237637

(51) Int. Cl.
*G05D 1/02* (2020.01)
*G06K 9/00* (2006.01)
*A01D 34/00* (2006.01)

(52) U.S. Cl.
CPC ......... *G05D 1/0219* (2013.01); *A01D 34/008* (2013.01); *G05D 1/0231* (2013.01); *G06K 9/00664* (2013.01); *G05D 2201/0201* (2013.01); *G05D 2201/0202* (2013.01)

(58) Field of Classification Search
CPC ............... A01D 34/008; A01D 34/006; A01D 2101/00; A01D 34/58; A01D 34/78; A01D 34/00; A01B 63/002; G05D 2201/0208; G05D 2201/0201; G05B 15/02; G06K 9/00664; Y10S 901/01

See application file for complete search history.

(56) References Cited

U.S. PATENT DOCUMENTS

| | | | | |
|---|---|---|---|---|
| 5,328,196 | A * | 7/1994 | Ohma | B62K 25/08 188/24.12 |
| 8,966,870 | B2 * | 3/2015 | MacKinnon | A01D 34/78 56/10.2 R |
| 9,864,376 | B2 * | 1/2018 | Franzius | H04N 13/239 |
| 2008/0039974 | A1 * | 2/2008 | Sandin | B60L 50/52 700/258 |

(Continued)

FOREIGN PATENT DOCUMENTS

| | | |
|---|---|---|
| DE | 19932552 C2 | 8/2002 |
| EP | 2342964 B1 | 10/2012 |

(Continued)

*Primary Examiner* — Redhwan K Mawari
(74) *Attorney, Agent, or Firm* — The Webb Law Firm

(57) ABSTRACT

A work vehicle configured to carry out a utility work while traveling autonomously includes an implement unit mounted on a vehicle body for carrying out the work, a work subject information acquisition section for accruing work subject information indicative of information on a work subject, a load calculation section for calculating a load of the work based on the work subject information, a storage section for storing driving conditions of the implement unit in advance, and a driving section configured to retrieve a driving condition stored in the storage section according to the load calculated by the load calculation section and to drive the implement unit based on the retrieved driving condition.

2 Claims, 2 Drawing Sheets

(56) References Cited

U.S. PATENT DOCUMENTS

| | | | | |
|---|---|---|---|---|
| 2008/0161968 A1* | 7/2008 | Adegbile | ............ | G08B 21/0269 700/245 |
| 2009/0271102 A1* | 10/2009 | Inoguchi | ............ | G08G 1/0962 701/118 |
| 2010/0223801 A1* | 9/2010 | Honey | ............ | A01D 43/0635 34/90 |
| 2011/0057485 A1* | 3/2011 | Shirai | ............ | B62J 1/08 297/199 |
| 2011/0166701 A1* | 7/2011 | Thacher | ............ | A01G 25/00 700/245 |
| 2011/0166705 A1* | 7/2011 | Anderson | ............ | B62D 57/032 700/253 |
| 2013/0268165 A1* | 10/2013 | Hashima | ............ | A01D 34/80 701/50 |
| 2014/0316634 A1* | 10/2014 | Biber | ............ | G05D 1/0219 701/23 |
| 2015/0096276 A1* | 4/2015 | Park | ............ | A01D 34/008 56/10.2 A |
| 2015/0105904 A1* | 4/2015 | Mou | ............ | B60L 58/21 700/245 |
| 2015/0296701 A1* | 10/2015 | Anderson | ............ | A01B 79/00 172/2 |
| 2016/0183451 A1* | 6/2016 | Conrad | ............ | A01D 34/66 56/10.2 R |
| 2017/0020064 A1* | 1/2017 | Doughty | ............ | A01G 25/09 |
| 2017/0112043 A1* | 4/2017 | Nair | ............ | A01B 33/16 |
| 2017/0245432 A1* | 8/2017 | Yoshimura | ............ | A01D 34/64 |
| 2018/0146616 A1* | 5/2018 | Fukano | ............ | B60L 50/52 |
| 2018/0257657 A1* | 9/2018 | Blank | ............ | B60W 50/14 |
| 2018/0303026 A1* | 10/2018 | Pellenc | ............ | A01D 34/58 |
| 2019/0116717 A1* | 4/2019 | Pauli | ............ | A01B 63/02 |
| 2019/0179326 A1* | 6/2019 | Uemoto | ............ | G05D 1/0219 |
| 2020/0370591 A1* | 11/2020 | Jiang | ............ | F16D 1/108 |

FOREIGN PATENT DOCUMENTS

| | | | | |
|---|---|---|---|---|
| JP | 7222507 A | 8/1995 | | |
| JP | 2003310026 A | 11/2003 | | |
| JP | 2012187026 A | 10/2012 | | |
| JP | 2013164741 A | 8/2013 | | |
| JP | 2014187951 A | 10/2014 | | |
| JP | 201515922 A | 1/2015 | | |
| JP | 201743885 A | 3/2017 | | |
| WO | WO-2011002512 A1 * | 1/2011 | ............ | G06K 9/4619 |
| WO | 2013034345 A1 | 3/2013 | | |
| WO | WO-2017048046 A1 * | 3/2017 | ............ | B25J 9/1664 |
| WO | 2017109318 A1 | 6/2017 | | |

\* cited by examiner

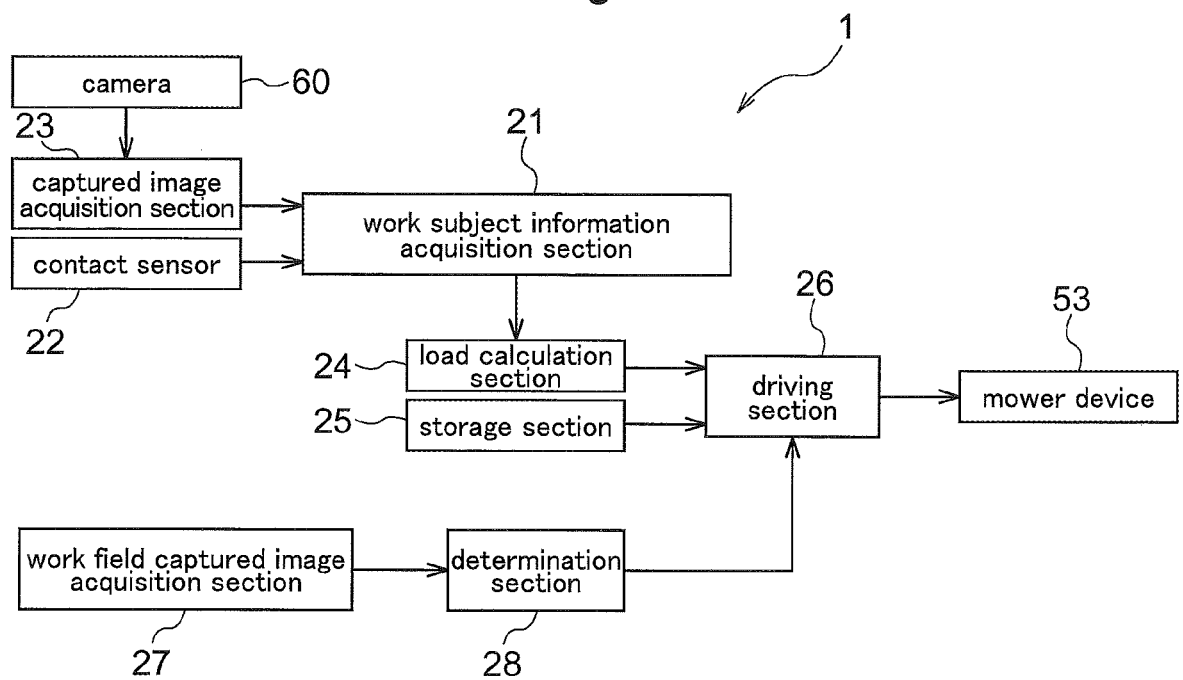

WORK VEHICLE

CROSS-REFERENCE TO RELATED APPLICATION

This application claims priority to Japanese Patent Application No. 2017-237637 filed Dec. 12, 2017, the disclosure of which is hereby incorporated in its entirety by reference.

TECHNICAL FIELD

The present invention relates to a work vehicle configured to carry out a utility work while traveling autonomously.

BACKGROUND ART

The convention has employed a technique of causing a vehicle to travel autonomously. As an example of such autonomous traveling vehicle, there is a work vehicle configured to effect unmanned traveling while carrying out a predetermined work (e.g. lawn cutting work) in a vast field. One kind of such technique is known from Patent Document 1 for example.

The unmanned traveling work vehicle disclosed in Patent Document 1 includes an electric motor mounted on a vehicle body and power-supplied from a battery and an engine mounted on the vehicle body. In operation, while the vehicle travels in a work area with wheels thereof being driven by the engine, the vehicle carries out a utility work with an implement mounted on the vehicle body being driven by the electric motor.

BACKGROUND ART DOCUMENT

Patent Document

Patent Document 1: Japanese Unexamined Patent Application Publication No. 2013-164741

SUMMARY

Problem to be Solved by Invention

According to the technique disclosed in Patent Document 1 described above, a work is carried out by driving the implement mounted on the vehicle body. As a specific example of such work described in Patent Document 1, there is a grass cutting work. The unmanned traveling work vehicle disclosed in Patent Document 1 cannot recognize working environment difference such as density, length, etc. of grass for instance, so the work will be carried out under constant working conditions. For this reason, if an excessive load is applied to the electric motor which drives the implement, the electric motor may be stalled to disable continuation of the work.

Thus, there is a need for a work vehicle capable of carrying out a work continuously irrespectively of working environment.

Solution

According to a characterizing feature of a work vehicle relating to one embodiment of the present invention, the work vehicle configured to carry out a utility work while traveling autonomously comprises:

an implement unit mounted on a vehicle body for carrying out the work;

a work subject information acquisition section for accruing work subject information indicative of information on a work subject;

a load calculation section for calculating a load of the work based on the work subject information;

a storage section for storing driving conditions of the implement unit in advance; and a driving section configured to retrieve a driving condition stored in the storage section according to the load calculated by the load calculation section and to drive the implement unit based on the retrieved driving condition.

With the above-described characterizing feature, a working condition suitable for working environment will be selected automatically and the work can be carried out under this working condition. Therefore, the work can be completed without applying any excessive load to the implement unit or to a driving device (e.g. a motor, etc.) that drives this implement unit. Consequently, with the above arrangement, it is possible to carry out a work continuously, irrespectively of the working environment.

Further, preferably, the work vehicle further comprises a captured image acquisition section mounted on the vehicle body and configured to acquire a captured image of a situation of the work subject, the work subject information acquisition section acquiring the work subject information based on the captured image.

With the above-described arrangement, the situation of the work subject can be grasped appropriately. Accordingly, accurate work subject information can be acquired.

Further, preferably, the work vehicle further comprises a contact sensor mounted on the vehicle body and configured to come into contact with the work subject for detecting the situation of the work subject, the work subject information acquisition section acquiring the work subject information based on the detection result of the contact sensor.

With this arrangement too, the situation of the work subject can be grasped appropriately and accurate work subject information can be acquired.

Further, preferably, the work vehicle further comprises a work field captured image acquisition section mounted on the vehicle body and configured to acquire a captured image of a situation of a work field where the work is to be carried out and a determination section for determining whether an area is one where the work has been carried out or not, the driving section driving the implement unit with using also determination result of the determination section.

With the above-described arrangement, determination is made whether an area is one where the work has been carried out or not and the implement unit is driven based on the determination result. Thus, the implement unit can be driven in a manner suitable for the situation of the work field. Therefore, the work can be carried out in an efficient manner with prevention of inadvertent omission of work.

BRIEF DESCRIPTION OF THE DRAWINGS

FIG. 3 is a block diagram schematically showing an arrangement of principal portion of the work vehicle,
and
FIG. 4 is a view showing working conditions stored in a storage section.

EMBODIMENTS

A work vehicle relating to the present invention is configured to be capable of carrying out a utility work continuously, irrespectively of working environment. This work vehicle is configured to carry out a work while traveling autonomously. In the following example, a grass (lawn) cutting work will be explained as such work to be carried out by this work vehicle. Here, the language "autonomous traveling" refers to traveling in which the vehicle travels along a traveling route set based on an output from a device mounted on the work vehicle (e.g. sensor output, captured images of a camera, etc.) while circumventing any object (e.g. an obstacle, etc.). Such work vehicle corresponds to a so-called autonomous robot.

Figure 1:
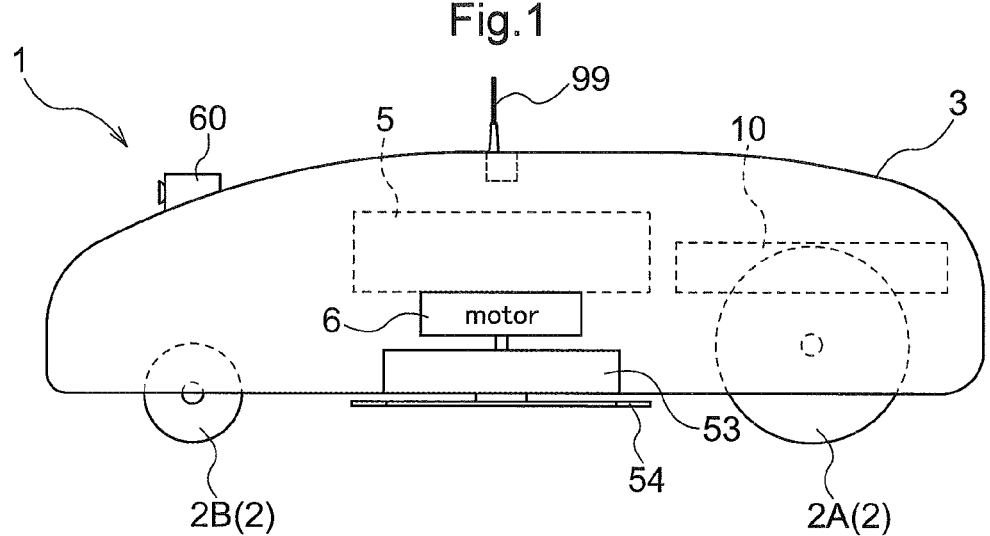
FIG. 1 is a side view of a work vehicle.
Figure 2:
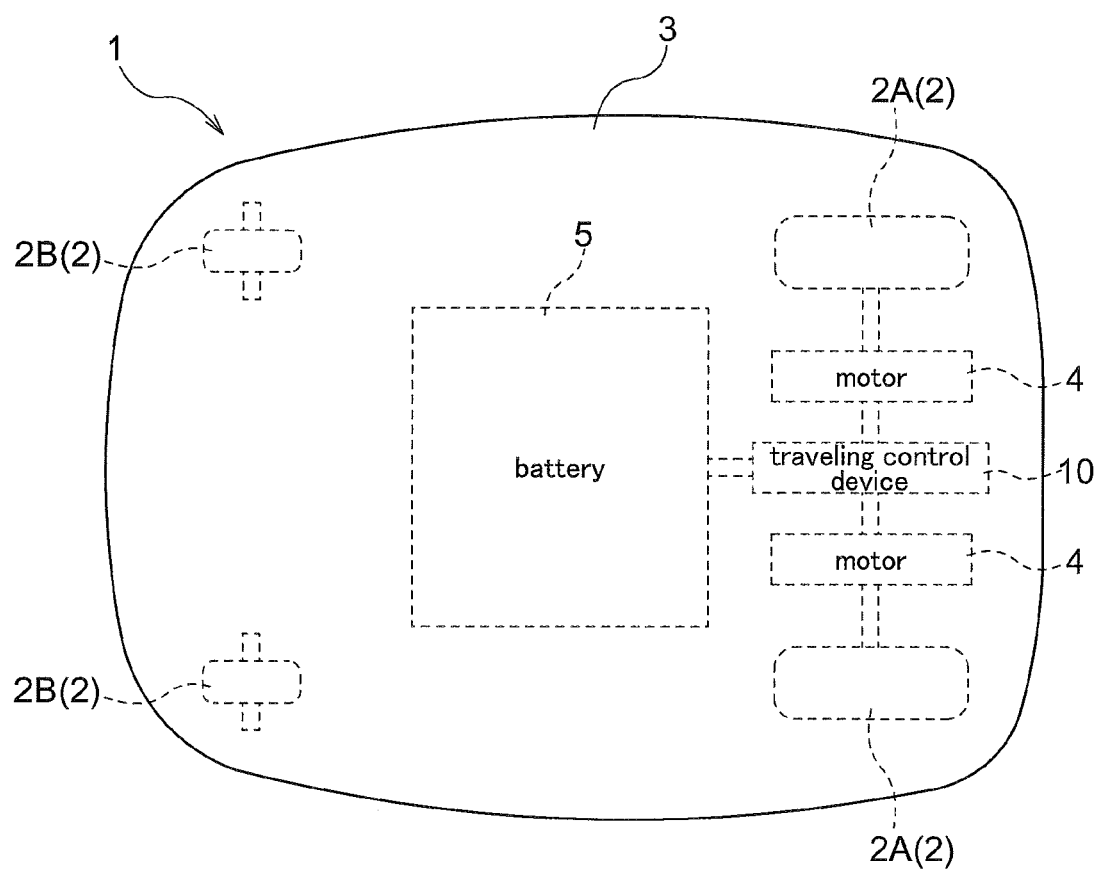
FIG. 2 is a plan view of the work vehicle.

FIG. 1 shows a side view of a work vehicle 1 relating to this embodiment. FIG. 2 shows a plan view of the work vehicle 1. As shown in FIG. 1 and FIG. 2, the work vehicle 1 includes wheels 2 and a machine body 3. The wheels 2 consist of first wheels 2A (an example of driving wheel unit) mounted on one end side in the longitudinal direction of the vehicle body and second wheels 2B mounted on the other end side in the longitudinal direction of the vehicle body. The first wheels 2A and the second wheels 2B are provided respectively one left and right pair along the width direction of the vehicle body. In this embodiment, the first wheels 2A are provided as driving/steering wheels provided on the rear side in the advancing direction of the work vehicle 1 and driven by a traveling control device 10 which will be described later. The second wheels 2B are provided as so-called caster wheels provided on the front side in the advancing direction of the work vehicle 1. Accordingly, straight traveling is provided when the left and right wheels of the first wheels 2A are rotated at an equal speed in a same direction. When the left and right wheels of the first wheels 2A are rotated at different speeds in a same direction, steering is made to the slower side. Further, when the left and right wheels of the first wheels 2A are rotated at an equal speed but in different directions, the work vehicle 1 can spin at the present location. Incidentally, in the above, it was explained that the first wheels 2A and the second wheels 2B are provided respectively one left and right pair along the width direction of the vehicle body. However, this is only an example. Alternatively, it is also possible to arrange such that the respective numbers of the first wheels 2A and the second wheels 2B are made different from each other in accordance with the size of the vehicle body for instance. Or, only one or more than three respectively thereof can be provided.

The vehicle body 3 mounts thereon a pair of motors 4 as power source for the first wheels 2A, a battery 5 storing electric power to be supplied to the motors 4 and other electric devices included in the work vehicle 1, the traveling control device 10 for controlling traveling of the work vehicle 1, and a further motor 6 for driving a mower device 53 (an example of an "implement unit") having a cutter blade 54 for use in grass (lawn) cutting work.

Further, the vehicle body 3 mounts a GPS module 99 configured as a GNSS module. This GPS module 99 includes a GPS antenna for receiving GPS signals or GNSS signals (GPS signals in the instant embodiment). Incidentally, the GPS module 99 can include an inertial navigation module incorporating a gyro acceleration sensor, a geomagnetic direction sensor, etc. in order to assist the GPS navigation. Needless to say, the inertial navigation module can be provided at a site different from the GPS module 99. GPS signals acquired by the GPS module 99 will be utilized for the autonomous traveling of the work vehicle 1 described above.

FIG. 3 is a block diagram schematically showing an arrangement of principal portion of the work vehicle 1 of this embodiment. The work vehicle 1 includes, in addition to the above-described functional sections, a work subject information acquisition section 21, contact sensors 22, a captured image acquisition section 23, a load calculation section 24, a storage section 25, a driving section 26, a work field captured image acquisition section 27 and a determination section 28, as further functional sections. These respective functional sections are built as hardware and/or software using a CPU as the core component thereof in order to allow the work vehicle 1 to carry out a utility work continuously. Incidentally, FIG. 3 shows the above-described mower device 53 also.

The work subject information acquisition section 21 is mounted on the vehicle body and configured to acquire work subject information indicative of information on a work subject. Here, the language "mounted on the vehicle body" means that it is mounted on the vehicle body 3 of the work vehicle 1. Information of a work subject refers to information relating to grass (lawn) as a subject of grass cutting work in this embodiment, which specifically corresponds to e.g. density, height of the grass. In the instant embodiment, the information indicative of the height and/or density of grass is handled as "work subject information" and the work subject information acquisition section 21 acquires such work subject information.

The contact sensors 22 are mounted on the vehicle body and configured to detect a situation of a work subject by coming into contact therewith. Such "situation of a work subject" to be detected by the contact sensors 22 corresponds to e.g. height, density of the grass as the subject of grass cutting work in this embodiment. So, the contact sensors 22 determine a reaction force generated when the grass is pushed and collapsed, thus detecting such grass height or grass density. Here, there is possibility of such grass height or grass density becoming unable to be calculated appropriately when the grass gets stamped on by the wheels of the work vehicle 1. Thus, in order to allow for appropriate calculation, in this embodiment, the contact sensors 22 are disposed on more advancing direction front side than the second wheels 2B which are disposed on the advancing direction front side of the vehicle body 1. Therefore, the contact sensors 22 are disposed on more advancing direction front side than the second wheels 2B provided on the advancing direction front side of the vehicle body 1 and come into contact with grass to be cut for detecting its height and/or density. The detection result of the contact sensors 22 will be transmitted to the work subject information acquisition section 21 described above. Based on such detection result of the contact sensors 22, the work subject information acquisition section 21 can obtain work subject information including information indicative of the grass height and/or grass density of the grass.

The captured image acquisition section 23 is mounted on the vehicle body and acquires a captured image of a situation of the work subject. Here, the situation of the work subject detected by the captured image acquisition section 23 corresponds to the grass height or grass density of the grass to be cut, in this embodiment. The captured image acquisition section 23 acquires a captured image of a work field where the grass cutting work is to be carried out, captured by a camera 60. In this regard, preferably, the captured image includes an image of the work field located on the traveling direction forward side of the work vehicle 1. In order to allow for appropriate image-capturing of such work field, in the instant embodiment, the camera 60 is set to face the advancing direction front side of the work vehicle 1, as shown in FIG. 1. The captured image acquired by the captured image acquisition section 23 is transmitted to the work subject information acquisition section 21 described above. Then, based on this captured image acquired by the captured image acquisition section 23, the work subject information acquisition section 21 can acquire the work subject information including information indicative of the grass height and/or grass density.

The load calculation section 24 calculates a load of work based on the work subject information. The work subject information is transmitted thereto from the above-described work subject information acquisition section 21. Preferably, such work load will be set in multiple levels for intensities of preset loads. Specifically, as shown in FIG. 4, in case the grass height is smaller than a predetermined value and grass density is lower than a predetermined value, then, it maybe said that the load of grass cutting work is light, so this corresponds to a level 1 which sets a cutting height to a predetermined first height and sets a rotational speed of the cutter blade 54 to a first speed. Further, if the grass height exceeds the predetermined value and the grass density is smaller than the predetermined value, it may be said that the load of grass cutting work is rather light, so this corresponds to a level 2 which sets the cutting height to a second height higher than the first height and sets the rotational speed of the cutter blade 54 to the first speed. Also, if the grass height is smaller than the predetermined value, but the grass density exceeds the predetermined value, it may be said that the load of grass cutting work is rather heavy, so this corresponds to a level 3 which sets the cutting height to the first height and sets the rotational speed of the cutter blade 54 to a second speed which is slower than the first speed. Still further, if the grass height exceeds the predetermined value and the grass density exceeds the predetermined value, it may be said that the load of grass cutting work is heavy, so this corresponds to a level 4 which sets the cutting height to the second height and sets the rotational speed of the cutter blade 54 to the second speed. In these manners, the load calculation section 24 calculates a load of a grass cutting work. And, the result of this calculation is transmitted to the driving section 26 which will be described later.

The storage section 25 stores in advance therein various driving conditions of the mower device 53 in correspondence with work loads. Here, the language "in correspondence with work loads" means in correspondence with various intensities of load, which are divided in the instant embodiment into the four levels from level 1 to level 4 as described above. The driving conditions of the mower device 53 represent e.g. a work speed, a cutting height, etc. The work speed corresponds to the rotational speed of the cutter blade 54 of the mower device 53. The cutting height corresponds to a height of the cutter blade 54 as measured from the work field surface. The storage section 25 stores therein such working speeds, cutting heights of the grass cutting work in four levels in correspondence with the load of grass cutting work.

The driving section 26 retrieves a driving condition stored in the storage section 25 in accordance with a load calculated by the load calculation section 24 and drives the mower device 53 based on the retrieved driving condition. Here, the language "a load calculated by the load calculation section 24" refers to a grass cutting load calculated by the load calculation section 24 in the manner described above. Then, based on the calculation result transmitted from the load calculation section 24, the driving section 26 retrieves a driving condition for the mower device 53 stored in the storage section 25. Further, on the driving condition corresponding to such calculation result, the driving section 26 drives the mower device 53. With this, application of excessive load to the motor 6 is prevented, so that a grass cutting work can be carried out continuously.

Moreover, in the instant embodiment, the vehicle body mounts the work field captured image acquisition section 27 configured to acquire a captured image image-capturing a situation of the work field where the work is to be carried out. Here, the work vehicle 1 carries out a grass cutting work while effecting an autonomous traveling in the work field. Thus, a traveling route will be set while traveling. In the course of this, if the vehicle travels in an area where a cutting work has already been carried out once, this will result in not only prolongation of the work period, but also increase in electric power consumption associated with traveling, thus being inefficient. Then, the situation of the work field means presence/absence of past execution of cutting work. Thus, the work field captured image acquisition section 27 acquires a captured image of the camera 60 which captures the situation relating to such presence/absence of past execution of cutting work in the work field. The captured image acquired by the work field captured image acquisition section 27 will be transmitted to the determination section 28 which will be described later.

The determination section 28 determines whether an area is one where a work has already been carried out or not, based on the captured image acquired by the work field captured image acquisition section 27. To this determination section 28, the captured image acquired by the work field captured image acquisition section 27 is transmitted and then the determination section 28 effects an image recognition processing on this captured image and determines whether the work field included in this captured image is an area where a cutting work has already been carried out or not. Further, if it is determined that this area is an area where no cutting work has yet been carried out, the determination section 28 can determine the grass height and grass density also. The result of determination made by the determination section 28 will be transmitted to the driving section 26 described above.

As described above, the driving section 26 retrieves a driving condition for the mower device 53 stored in the storage section 25 in accordance with the calculation result transmitted from the load calculation section 24 and then drives the mower device 53 based on such driving condition. In this, driving of the mower device 53 utilizes also the determination result from the determination section 28. With this, in a work field for a grass cutting work, by controlling such that the vehicle will not travel again in a section where the work has been carried out and/or the mower device 53 will be stopped at such section, efficient grass cutting work is made possible. Incidentally, in such control for inhibiting repeated traveling in an area where the work has been carried out, the determination result indicative of whether an area is an area where the cutting work has been carried out may be transmitted from the driving section 26 to the traveling control device 10 (see FIG. 1) and the traveling control device 10 (see FIG. 1) may set the traveling route. In this, alternatively, the determination result indicative of whether an area is an area where the cutting work has been carried out may be transmitted from the determination section 28 to the traveling control device 10 (see FIG. 1) also.

Other Embodiments

In the foregoing embodiment, it was explained that the work vehicle 1 includes the contact sensors 22 and the captured image acquisition section 23. However, the work vehicle 1 may include only one of the contact sensor 22 and the captured image acquisition section 23 or may omit both the contact sensor 22 and the captured image acquisition section 23.

In the foregoing embodiment, it was explained that the work vehicle 1 includes the work field captured image acquisition section 27 and the determination section 28. Alternatively, the work vehicle 1 may omit both the work field captured image acquisition section 27 and the determination section 28.

In the foregoing embodiment, it was explained that work conditions stored in the storage section 25 are divided into four levels from level 1 to level 4, with each level defining a cutting height and a rotational speed of the cutter blade 54. Instead, the division of the work conditions can be made in three or fewer levels, or five or more levels. Further, it is also possible as a matter of course such that the cutting height and the rotational speed of the cutter blade 54 are defined independently of each other.

In the foregoing embodiment, it was explained that the work is a grass (lawn) cutting work. The work maybe any other kind of work, instead.

INDUSTRIAL APPLICABILITY

The present invention is applicable to a work vehicle configured to effect a utility work while traveling autonomously.

DESCRIPTION OF REFERENCE MARKS/NUMERALS

1: work vehicle
21: work subject information acquisition section
22: contact sensor
23: captured image acquisition section
24: load calculation section
25: storage section
26: driving section
27: work field captured image acquisition section
28: determination section
53: mower device (implement unit)

The invention claimed is:

1. A work vehicle configured to carryout a utility work while traveling autonomously comprising:
a mower device including a cutter blade mounted on a vehicle body;
a sensor mounted on the vehicle body for detecting at least one of a height and a density of grass as a situation of the grass which is a work subject, wherein the sensor includes a camera; and
a processor mounted on the vehicle body, the processor being configured to:
  acquire, from an image captured by the camera, the situation of the grass contained in the image captured by the camera, wherein the situation of the grass includes the at least one of the height and the density of the grass;
  calculate a load of the utility work based on the situation of the grass including the at least one of the height and the density of the grass;
  store in advance a driving condition of the cutter blade determined in accordance with the load of the utility work; and
  drive the cutter blade based on the driving condition in accordance with the load of the utility work,
  wherein the situation of the grass includes the height and the density of the grass, and
  wherein the processor stores in advance a plurality of driving conditions corresponding to a plurality of work load levels, wherein the plurality of work load levels are divided in accordance with heights and densities of the grass, wherein the plurality of driving conditions are divided in accordance with heights and rotational speeds of the cutter blade, wherein the processor determines the load of the utility work as a work load level of the plurality of work load levels corresponding to the height and the density of the grass, and wherein the processor drives the cutter blade according to a height and a rotational speed of the cutter blade of the driving condition of the plurality of driving conditions corresponding to the determined work load level.

2. The work vehicle of claim 1, wherein the processor is further configured to:
  based on a situation of a work field where the utility work is to be carried out contained in the image captured by the camera, determine whether an area is one where the utility work has been carried out or not,
  in response to determining that the utility work has been carried out in the area, control the work vehicle to not carryout the utility work in the area, and
  in response to determining that the utility work has not been carried out in the area, drive the cutter blade based on a relation between the load and the driving condition.

* * * * *